UNITED STATES PATENT OFFICE.

ALFRED S. HALLAND, OF BUFFALO, NEW YORK, ASSIGNOR TO NIAGARA SPRAYER COMPANY, OF MIDDLEPORT, NEW YORK.

INSECTICIDE COMPOSITION.

1,044,452.      Specification of Letters Patent.      Patented Nov. 12, 1912.

No Drawing.      Application filed March 2, 1912. Serial No. 681,303.

*To all whom it may concern:*

Be it known that I, ALFRED S. HALLAND, a subject of the King of Denmark, residing at Buffalo, in the county of Erie and State of New York, have invented certain new and useful Improvements in Insecticide Compositions; and I do hereby declare the following to be a full, clear, and exact description of the invention, such as will enable others skilled in the art to which it appertains to make and use the same.

The invention relates to insecticides and fungicides, and the process of making the same; and it has for its chief object the production of a simple and efficacious composition which may be readily and quickly applied in the form of a spray to trees, plants, shrubs, and vines, without danger of injuring the foliage or fruit thereof.

Other objects of the invention will become apparent upon a complete disclosure thereof.

My compound or composition comprises the reaction product obtained by fusing together sulfur and sodium carbonate (soda ash), which is capable of being dissolved in water.

In the preparation of the compound or composition, I take preferably equal, or approximately equal quantities, of sulfur and sodium carbonate and thoroughly mix them together. The mixture is then placed in a suitable retort or reaction vessel and subjected to a temperature not exceeding 400 degrees centigrade. I have found in practice that reaction begins slowly at about 200 degrees cent., and is completed at about 250 degrees cent. At about this temperature the reaction will be accomplished under the evolution of carbonic acid gas, causing the mass to boil, and as soon as the gas-evolution ceases the process is completed. The mass is then removed from the reaction vessel, and when cooled becomes a hard mass of a greenish yellow color, consisting of a mixture of sodium polysulfids and sodium thiosulfate, readily soluble in water.

The quantity of sulfur and sodium carbonate may be slightly varied without causing any radical change in the character of the substance or its insecticide or fungicidal value, for instance, fifty-two parts of sulfur to forty-eight parts of sodium carbonate may be used, or forty-eight parts of the former to fifty-two parts of the latter, the sulfur used being preferably in powdered form, although it will be understood that sulfur in the lump is equally well adapted for the purpose. After the mass has been allowed to cool and harden, it is then reduced to granular form, so as to facilitate its storing and shipment.

In use, the granular mixture is dissolved in water and sprayed upon the trees, plants, etc., which it is desired to protect from insects, worms, and other vermin, at certain times of the year, the quantity of water per pound of mixture varying according to the character of the tree or plant, and the advanced condition of the foliage, bloom, or fruit.

In practising my invention, I do not wish to be understood as limiting myself to sodium carbonate as one of the ingredients of the compound, as I may substitute caustic soda for the sodium carbonate, or use part caustic soda and part sodium carbonate, using 0.75 lb. caustic soda (100%) for each 1 lb. soda substituted.

I am aware that sodium carbonate and sulfur have been fused together in different proportions, for the production of "soda liver of sulfur" which process I disclaim. The expression "in equal parts" employed in the appended claims means that the variation from exactly equal parts does not exceed 48 parts of either to 52 parts of the other. When any considerable excess of sulfur, over this proportion is used, there will be insoluble sulfur remaining in the same, while if more sodium carbonate is used it will be left unacted upon, and will thereby lessen the amount of soluble sulfur in the product. It will therefore be seen that by my process, I produce a product which has a maximum amount of soluble sulfur.

Having thus described my invention, what I claim is:

1. The process of making an insecticide compound which comprises melting together equal parts of sulfur and sodium carbonate and allowing the reaction products to cool.

2. The process of making an insecticide compound which comprises melting together at 200 to 400 degrees C. equal parts of sulfur and sodium carbonate and allowing the reaction products to cool.

3. The process of making an insecticide compound which comprises melting together at about 250 degrees C. equal parts of sulfur and sodium carbonate and allowing the reaction products to cool.

4. The herein described product which may be produced by melting together equal parts of sodium carbonate and sulfur, said product being a greenish yellow, solid mass, completely soluble in water, and containing a maximum quantity of soluble sulfur.

In testimony whereof I affix my signature, in the presence of two witnesses.

ALFRED S. HALLAND.

Witnesses:
CHAS. F. EWING,
H. E. CASTLE.